United States Patent
Sathish et al.

(10) Patent No.: US 9,477,664 B2
(45) Date of Patent: Oct. 25, 2016

(54) METHOD AND APPARATUS FOR QUERYING MEDIA BASED ON MEDIA CHARACTERISTICS

(75) Inventors: Sailesh Kumar Sathish, Tampere (FI); Igor Danilo Diego Curcio, Tampere (FI)

(73) Assignee: Nokia Technologies Oy, Epsoo (FI)

( * ) Notice: Subject to any disclaimer, the term of this patent is extended or adjusted under 35 U.S.C. 154(b) by 633 days.

(21) Appl. No.: 13/285,429

(22) Filed: Oct. 31, 2011

(65) Prior Publication Data
US 2013/0110841 A1 May 2, 2013

(51) Int. Cl.
G06F 17/30 (2006.01)
G06F 7/00 (2006.01)

(52) U.S. Cl.
CPC ..... *G06F 17/3002* (2013.01); *G06F 17/30038* (2013.01); *G06F 17/30864* (2013.01); *G06F 17/30867* (2013.01)

(58) Field of Classification Search
USPC .......................................... 707/741
See application file for complete search history.

(56) References Cited

U.S. PATENT DOCUMENTS

| | | | | |
|---|---|---|---|---|
| 6,731,825 B1* | 5/2004 | Acampora | ........... | H04N 5/2224 345/630 |
| 2005/0123053 A1* | 6/2005 | Cooper | ................. | G11B 27/28 375/240.24 |
| 2006/0161403 A1* | 7/2006 | Jiang | ........................ | G06F 17/18 703/2 |
| 2006/0245631 A1* | 11/2006 | Levenson | ............. | G06K 9/6247 382/133 |
| 2008/0013821 A1* | 1/2008 | Macgregor | .......... | G05B 13/048 382/141 |
| 2010/0149568 A1* | 6/2010 | Owens | ................. | H04N 1/6055 358/1.9 |
| 2011/0029561 A1* | 2/2011 | Slaney | .............. | G06F 17/30247 707/772 |
| 2011/0314031 A1* | 12/2011 | Chittar | ................ | G06F 17/3025 707/749 |
| 2012/0078899 A1* | 3/2012 | Fontana | .............. | G06F 17/3079 707/736 |

OTHER PUBLICATIONS

International Search Report for related International Patent Application No. PCT/FI2012/050944 dated Feb. 26, 2013, pp. 1-5.
Written Opinion for related International Patent Application No. PCT/FI2012/050944 dated Feb. 26, 2013, pp. 1-11.
C. Carson, et al., "Blobworld: A System for Region-Based Image Indexing and Retrieval (long version)," Retrieved from the Internet Archive <URL: http://web.archive.org/web/20060601000000*/ http://www.eecs.berkeley.edu/Pubs.TechRpts/1999/CSD-99-1041.pdf>.
R. Sarvas, et al., "Metadata Creation System for Mobile Images," Proceedings of the 2nd International Conference on Mobile Systems, Applications, and Services (MobiSYS '04), Jun. 6-9, 2004, Boston, Massachusetts, U.S.A.

(Continued)

Primary Examiner — Kuen Lu
(74) Attorney, Agent, or Firm — Ditthavong & Steiner, P.C.

(57) ABSTRACT

An approach is provided for querying media based on media characteristics. A media platform processes and/or facilitates a processing of one or more images, one or more videos, or a combination thereof to determine one or more latent vectors associated with the one or more images, the one or more videos, or the combination thereof. The media platform further causes, at least in part, a comparison of the one or more latent vectors to one or more models. The media platform also causes, at least in part, an indexing of the one or more images, the one or more videos, or the combination thereof based, at least in part, on the one or more latent vectors, the one or more models, or a combination thereof.

19 Claims, 12 Drawing Sheets

(56) References Cited

OTHER PUBLICATIONS

R. K. Srihari, et al., "Intelligent Indexing and Semantic Retrieval of Multimodal Documents," Information Retrieval, May 2000, vol. 2, Issue 2-3, pp. 245-275, Kluwer Academic Publisher, Print ISSN 1386-4564, The Netherlands.

"Google Maps User Guide," Retrieved from the Internet Archive <URL: http:web.archive.org/web/20070704131023/http://maps.google.com/support/bin/answer.py?answer=68480#navigating>, Archived on Jul. 4, 2007.

"Google Maps API Tutorial—Sending KML files to Google Maps," Retrieved from the Internet Archive <URL: http://web.archive.org/web/20080921181940/http://econym.org.uk/gmap/kml.htm>, Archived on Sep. 21, 2008.

* cited by examiner

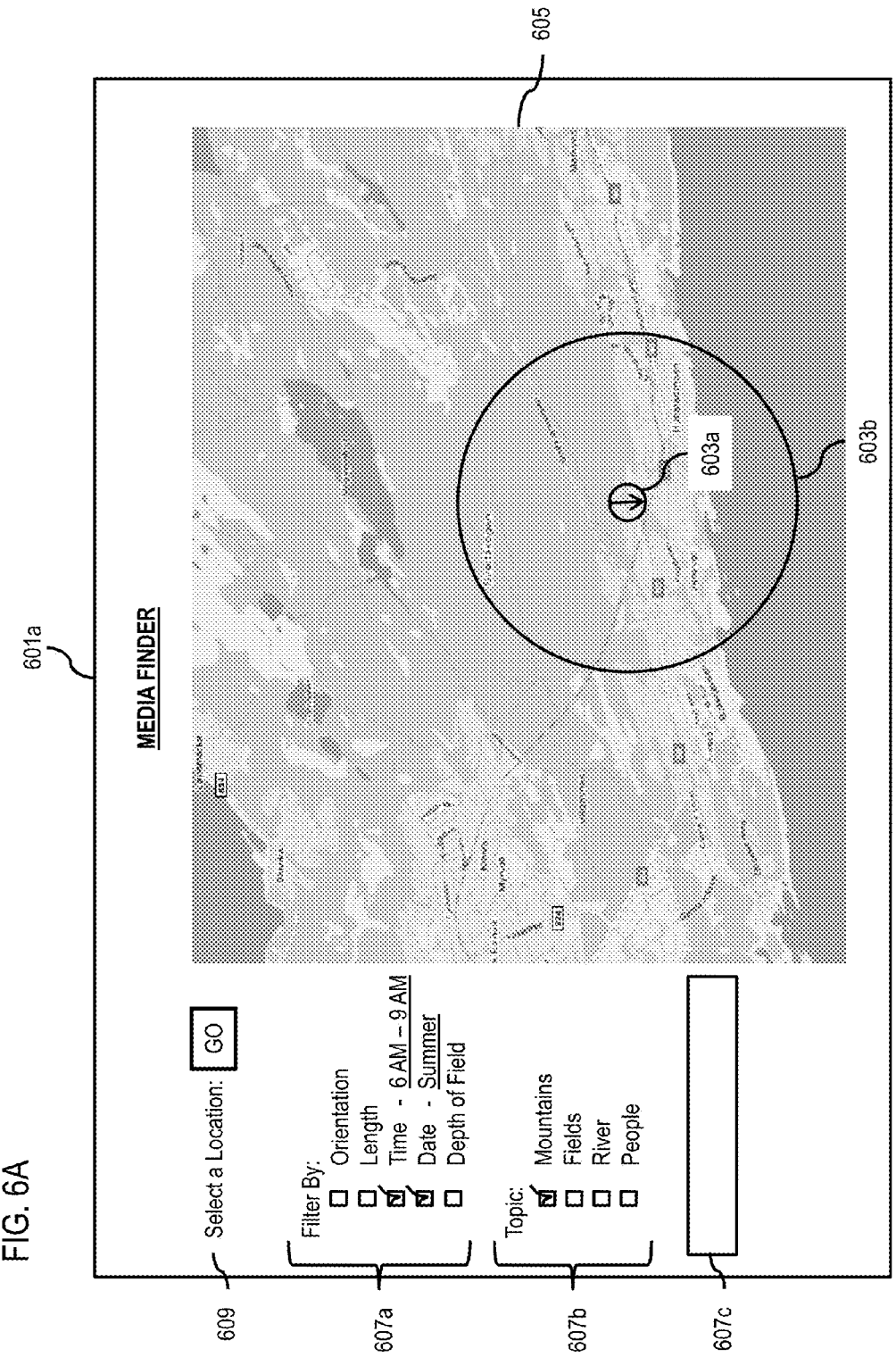

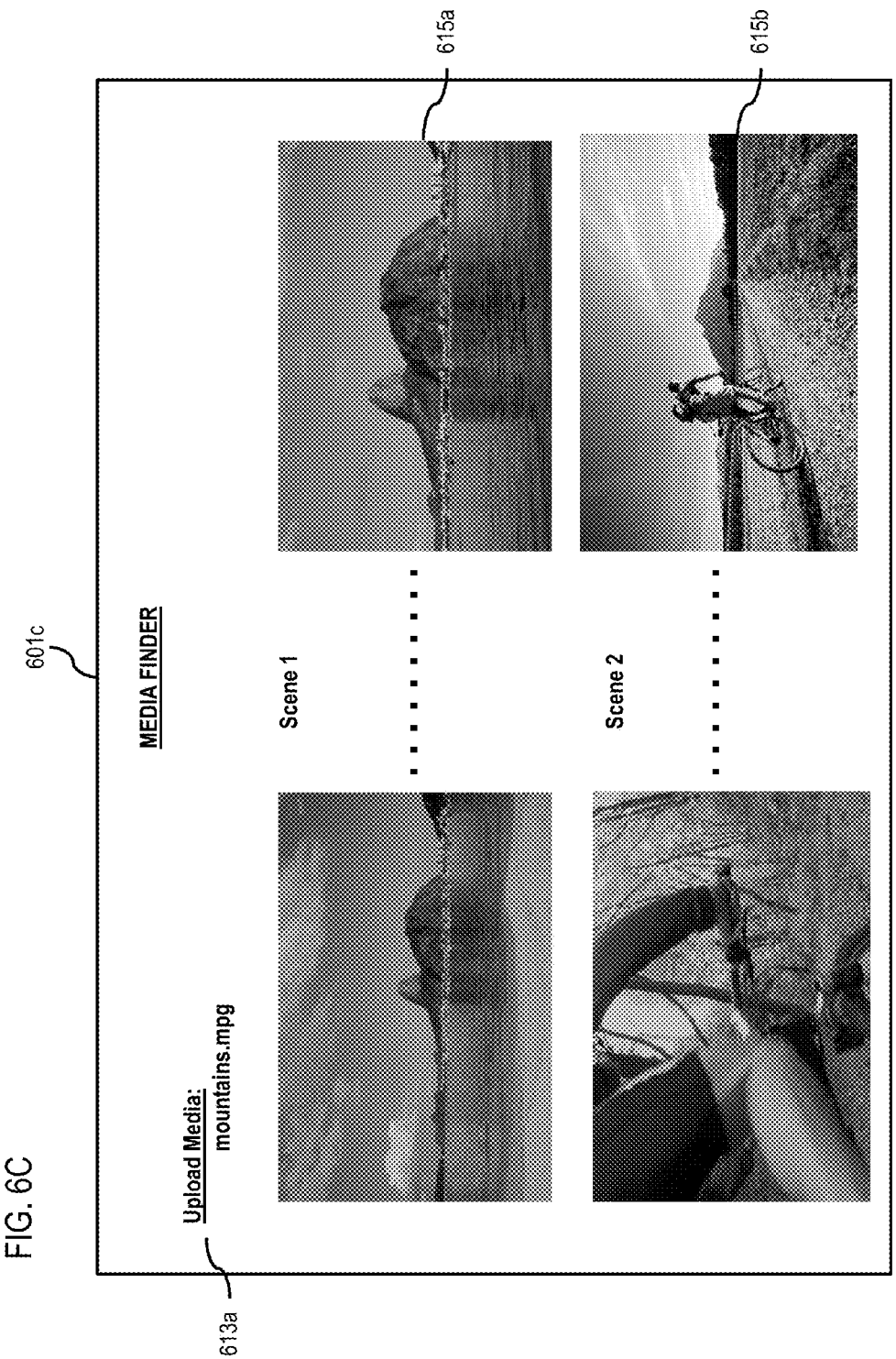

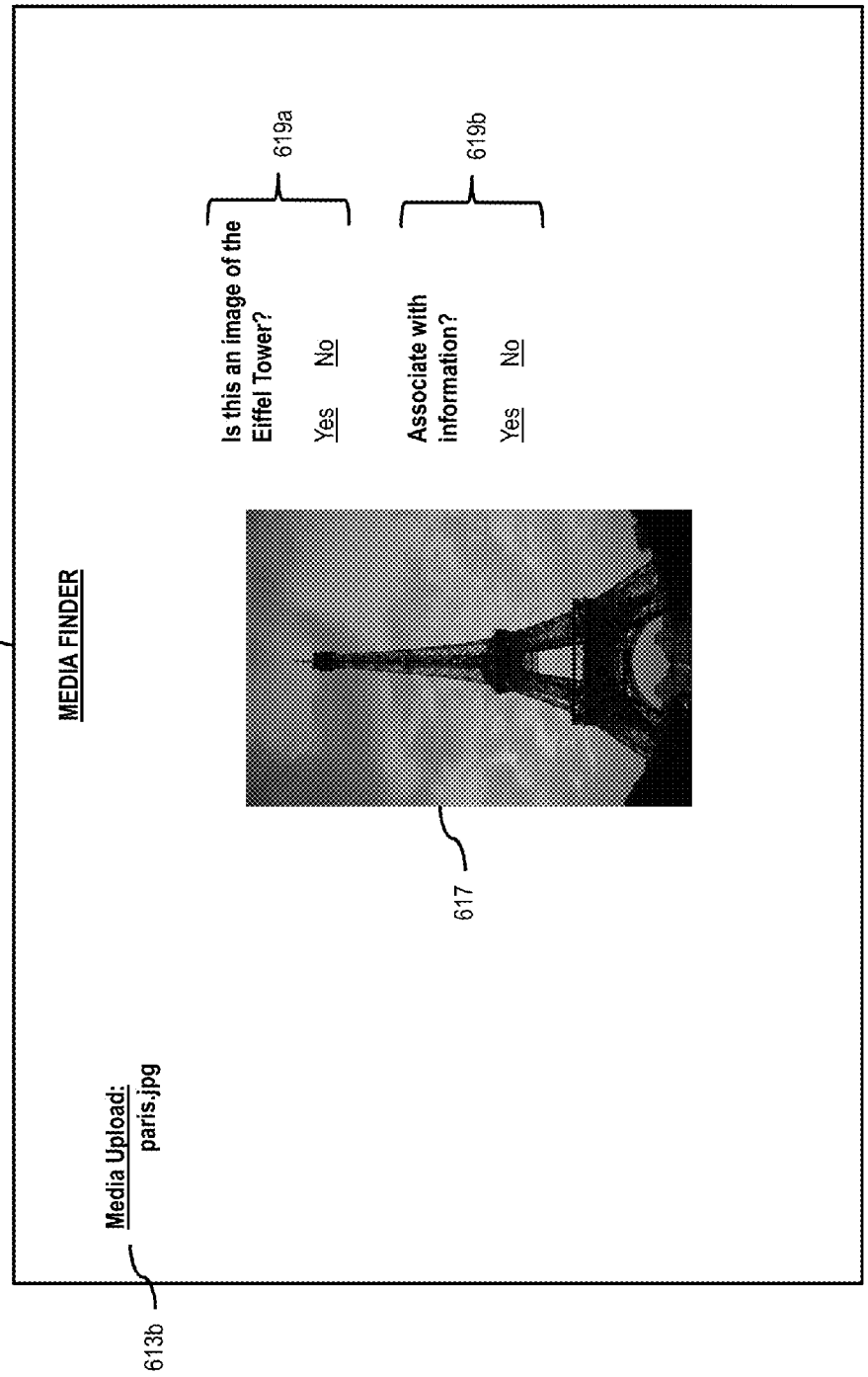

METHOD AND APPARATUS FOR QUERYING MEDIA BASED ON MEDIA CHARACTERISTICS

BACKGROUND

Service providers and device manufacturers (e.g., wireless, cellular, etc.) are continually challenged to deliver value and convenience to consumers by, for example, providing compelling network services. The amount of user-created content accessible by devices through the network services is increasing. However, no services currently exist that allow a consumer to query for media (e.g., an image or a video) based on the characteristics associated with the media, such as a location associated with the media, or a location associated with the media that is within a boundary of a location. Further, no such services currently exist that allow a consumer to query for media based on the type of content that is contained within the media. By way of example, a consumer cannot tell that a video contains mountains unless the author of the video tagged the video as including mountains. Therefore, service providers and device manufacturers face significant technical challenges in providing a service that allows consumers to query media based on, for example, the location of the media, as well as other characteristics associated with the media.

SOME EXAMPLE EMBODIMENTS

Therefore, there is a need for an approach for querying media based on characteristics associated with the media.

According to one embodiment, a method comprises causing, at least in part, a rendering of a user interface for determining a selection of at least one of the one or more models, one or more objects represented by the one or more models, or a combination thereof. The method also comprises causing, at least in part, a querying of the index for the one or more images, the one or more videos, one or more segments of the one or more images, one or more segments of the one or more videos, or a combination thereof based, at least in part, on the selection. The method further comprises causing, at least in part, a rendering of one or more results of the query in the user interface. According to another embodiment, a method comprises processing and/or facilitating a processing of one or more images, one or more videos, one or more segments of the one or more images, one or more segments of the one or more videos, or a combination thereof to determine one or more latent vectors (also known as eigenvectors, characteristic vectors or invariant vectors) associated with the one or more images, the one or more videos, the one or more segments of the one or more images, the one or more segments of the one or more videos, or the combination thereof. The method also comprises causing, at least in part, a comparison of the one or more latent vectors to one or more models. The latent vectors may represent one or more objects and/or topics contained in the media and act as a signature for the media. The one or more models may represent one or more known objects and the associated latent vectors of the known objects. The latent vectors are representational vectors based on one or more latent parameters that characterize the associated images, videos, and segments of the images/and or videos. The method further comprises causing, at least in part, an indexing of the one or more images, the one or more videos, the one or more segments of the one or more images, the one or more segments of the one or more videos, or the combination thereof based, at least in part, on the one or more latent vectors, the one or more models, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to render a user interface for determining a selection of at least one of the one or more models, one or more objects represented by the one or more models, or a combination thereof. The apparatus is also caused to query the index for the one or more images, the one or more videos, one or more segments of the one or more images, one or more segments of the one or more videos, or a combination thereof based, at least in part, on the selection. The apparatus is further caused to render one or more results of the query in the user interface. According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more images, one or more videos, one or more segments of the one or more images, one or more segments of the one or more videos, or a combination thereof to determine one or more latent vectors associated with the one or more images, the one or more videos, the one or more segments of the one or more images, the one or more segments of the one or more videos, or the combination thereof. The apparatus is also caused to compare the one or more latent vectors to one or more models. The apparatus is further caused to index the one or more images, the one or more videos, the one or more segments of the one or more images, the one or more segments of the one or more videos, or the combination thereof based, at least in part, on the one or more latent vectors, the one or more models, or a combination thereof.

According to another embodiment, a computer-readable storage medium carries one or more sequences of one or more instructions which, when executed by one or more processors, cause, at least in part, an apparatus to render a user interface for determining a selection of at least one of the one or more models, one or more objects represented by the one or more models, or a combination thereof. The apparatus is also caused to query the index for the one or more images, the one or more videos, one or more segments of the one or more images, one or more segments of the one or more videos, or a combination thereof based, at least in part, on the selection. The apparatus is further caused to render one or more results of the query in the user interface. According to another embodiment, a computer-readable storage medium carries one or more sequences of one or more instructions which, when executed by one or more processors, cause, at least in part, an apparatus to process and/or facilitate a processing of one or more images, one or more videos, the one or more segments of the one or more images, the one or more segments of the one or more videos, or a combination thereof to determine one or more latent vectors associated with the one or more images, the one or more videos, the one or more segments of the one or more images, the one or more segments of the one or more videos, or the combination thereof. The apparatus is also caused to compare the one or more latent vectors to one or more models. The apparatus is further caused to index the one or more images, the one or more videos, the one or more segments of the one or more images, the one or more segments of the one or more videos, or the combination thereof based, at least in part, on the one or more latent vectors, the one or more models, or a combination thereof.

According to another embodiment, an apparatus comprises means for causing, at least in part, a rendering of a user interface for determining a selection of at least one of the one or more models, one or more objects represented by the one or more models, or a combination thereof. The apparatus also comprises means for causing, at least in part, a querying of the index for the one or more images, the one or more videos, one or more segments of the one or more images, one or more segments of the one or more videos, or a combination thereof based, at least in part, on the selection. The apparatus also comprises means for causing, at least in part, a rendering of one or more results of the query in the user interface. According to another embodiment, an apparatus comprises means for processing and/or facilitating a processing of one or more images, one or more videos, the one or more segments of the one or more images, the one or more segments of the one or more videos, or a combination thereof to determine one or more latent vectors associated with the one or more images, the one or more videos, the one or more segments of the one or more images, the one or more segments of the one or more videos, or the combination thereof. The apparatus also comprises means for causing, at least in part, a comparison of the one or more latent vectors to one or more models. The apparatus further comprises means for causing, at least in part, an indexing of the one or more images, the one or more videos, the one or more segments of the one or more images, the one or more segments of the one or more videos, or the combination thereof based, at least in part, on the one or more latent vectors, the one or more models, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-31, and 48-50.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6D are diagrams of user interfaces utilized in the processes of FIGS. 3-5, according to various embodiments;

DESCRIPTION OF SOME EMBODIMENTS

Examples of a method, apparatus, and computer program for querying media based on characteristics associated with the media are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term media refers to any type of media that may include, for example, one or more images, one or more fragments or portions of images, one or more animated images, one or more fragments or portions of animated images, one or more videos, one or more fragments or portions of videos, or a combination thereof, where the media may be two-dimensional, three-dimensional, or a combination thereof. Although various embodiments are described with respect to images and videos, it is contemplated that the approach described herein may be used with other type of content that can be indexed according to one or more characteristics associated with the media.

Figure 1:
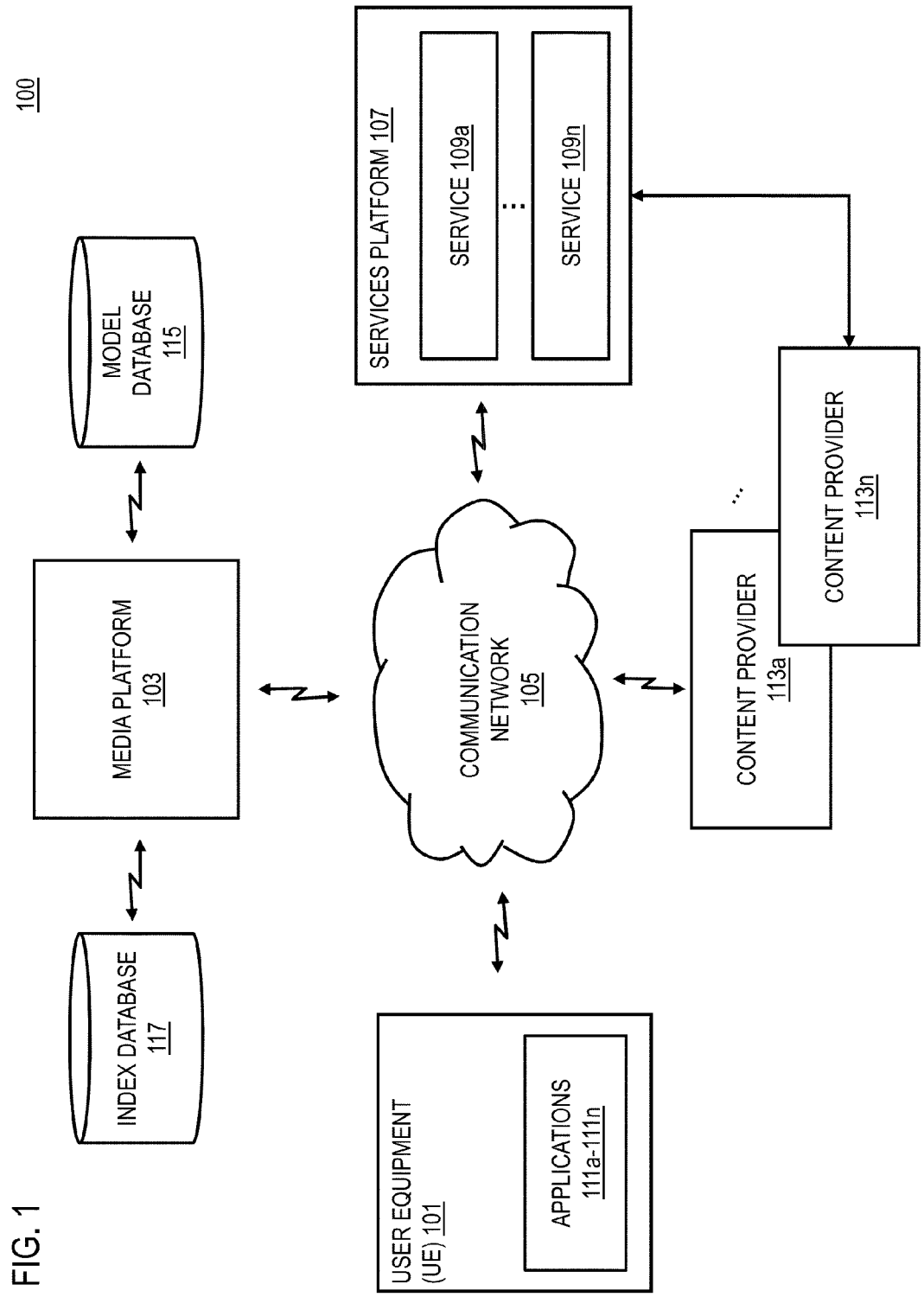
FIG. 1 is a diagram of a system capable of querying media based on characteristics associated with the media, according to one embodiment.

FIG. 1 is a diagram of a system capable of querying media based on characteristics associated with the media, according to one embodiment. As discussed above, the popularity of user-created media has exponentially increased the amount of media that is accessible through various service providers and the Internet. Despite the increase in the amount of media that is accessible, service providers have not developed platforms that allow querying of the media based on certain characteristics of the media. For example, service providers have not developed platforms that allow querying of the media based on the location associated with the media. This problem is in part associated with media often not being properly labeled to describe the topics covered or included in the media, such as the location associated with the media. For example, a service that allows for the querying of media based on the characteristics of the media relies on the media being indexed according to the characteristics. While users may tag the media to define the topics of the media or define what the media concerns, often the tags fail to capture the true nature of the media or fail to capture the extent of information that is covered by the media.

By way of example, a user may capture a video of the surrounding environment while out on a hike. To remember the content of the video, the user may label the video according to the date the video was taken and the general subject of video (e.g., hike). However, the user may fail to tag the video according to the location of the video, where automatic tagging of the video according to, for example, the location is not done automatically based on the acquiring device. Alternatively, even if the video is tagged according to, for example, the location by the user or by the device, the user may not provide additional annotations to the already embedded location metadata. Further, the user may fail to tag the video according to the video covering topics such as mountains, rivers, trees, fields, etc. that the user passed by while on the hike. The user also may have failed to tag the various aspects of how the video was captured (e.g., frame rate, perspective, direction, field of view, etc.). Moreover, even considering media that includes all of the above metadata (e.g., location information, topic information, characteristic information, etc.), and assuming such media is uploaded to querying services, current media querying services do not provide ways to query for media based on the above-mention characteristics. Therefore, although the amount of media is increasing at an ever increasing rate based on new services and devices, the ability of users to access this media based on querying platforms has not increased to meet the increase in the amount of media.

To address this problem, a system 100 of FIG. 1 introduces the capability to query media based on characteristics associated with the media. The system 100 may render a user interface for determining a selection of at least one of one or more models, at least one of one or more objects represented by the one or more models, one or more characteristics associated with the media, or a combination thereof. By way of example, the system 100 may render a user interface in the form of a map on a user device. The map may cover an area that is selected by a user, such as a specific country, specific coordinates, a boundary around a specific location, or the like. Thus, based on the user interface of the map, the user may query for media that is associated with the location represented by the map.

The queried media may be defined by a selected model, a selected object represented by the model, or characteristics associated with the media. By way of example, if the user is querying for media associated with a mountain for the specific location, the user may provide a query string, such as mountain, that would result in selecting the appropriate model of a mountain on a server end as a basis for performing a match/selection process. Alternatively, or in addition to the foregoing, the user may select an object represented by the model of a mountain, such as a representative image of a mountain, that would result in selecting the model of a mountain on a server end as a basis for performing a match/selection process. Further, the user may enter characteristics associated with a mountain, and may further select one or more characteristics associated with the media, such as time of day, season, orientation, depth of field, etc.

The system 100 further queries an index of media based on the selection associated with the user interface. The queried media may represent one or more images and/or one or more videos. In one embodiment, the queried media may represent one or more segments of the one or more images and/or one or more videos. Thus, in one embodiment, the system 100 allows for segmenting media associated with the system 100 into one or more segments that more narrowly define the content of the media within the segments. By way of example, if a single video includes segments associated with a lake, mountains, and a river, respectively, the video can be segmented into the three respective segments and each segment may be queried for separately as compared to the entire video.

The system 100 further renders one or more results of the query in the user interface. The one or more results of the query represent the media that are associated with the selected models, objects, and/or characteristics. For example, where the user interface is associated with a map of a location, the results of the query are media that are associated with the location. The media may be further defined by the selected models, objects represented by the models, and/or the characteristics.

By way of example, the user selects the object of mountains associated with a certain area represented by a map rendered in the user interface. The system 100 then queries an index for all of the media associated with the model of mountains and associated with the location represented by the map. Upon determining the media that are associated with the model of mountains and the location, the system 100 presents all of the media satisfying the query to the user for the user to select from. Accordingly, the system 100 presents a way for querying and presenting media associated with, for example, a specific location, a boundary around a specific location, and other characteristics associated with the media. Thus, by way of example, if the user is creating a video and requires many different videos with many different topics and/or objects associated with the videos, the system 100 may provide the user a way of querying for media based on the topics and/or objects associated with the media according to the characteristics associated with the media.

In one embodiment, the system 100 indexes media so that the media may be queried by the system 100. The system 100 may process the media to determine one or more latent vectors associated with the media. Prior to processing the media to determine the one or more latent vectors, the media may be segmented into one or more smaller segments. The system 100 may then process the segments of the media to determine one or more latent vectors associated specifically with the segments. The latent vectors may represent the one or more objects and/or topics contained in the media and act as a signature for the media. The system 100 may then cause a comparison of the one or more latent vectors with one or more models. The one or more models may represent one or more known objects and the associated latent vectors of the known objects. The latent vectors associated with the objects are determined based on factorizing one or more media covering or associated with one or more known topics, sets of topics, and/or content using latent parameters. By comparing the one or more latent vectors determined from the media with the one or more models, the system 100 may determine the topics and/or objects within the media and index the media accordingly. Further, by optionally segmenting the media into one or more smaller segments, the system 100 may determine topics, sets of topics, and/or objects within the segments of the media and index the segments accordingly. Thus, by way of example, one or more segments of media may by indexed differently than the media itself based on the specificity of the content within the one or more segments.

By way of example, one media may be a video of a mountain. The latent vector calculated for the mountain will have certain signatures that are unique to a mountain. By comparing the latent vector associated with the video, and, therefore, associated with the mountain, to a latent vector associated with a model of a mountain, the system 100 may determine that the media is associated with the object of a mountain. The system 100 may then cause an indexing of the media based on the one or more latent vectors associated with the media, the one or more models associated with the media according to the comparison, or a combination thereof. Therefore, the system 100 allows the media to be indexed based on the media including the object of the mountain regardless of whether the media was tagged as being associated with a mountain. Accordingly, the system 100 allows for access to the increasing number of media based on latent vectors associated with the media.

As shown in FIG. 1, the system 100 comprises a user equipment (UE) 101 having connectivity to media platform 103 via a communication network 105. The user equipment may include one or more applications 111*a*-111*n* (collectively referred to as applications 111) executed by the UE 101. By way of example, exemplary applications 111 may include video editing applications, image editing applications, Internet browsing applications, social networking applications, media sharing applications, and the like. In one embodiment, one or more of the applications 111 interface with the media platform 103 for querying for the media.

In one embodiment, the media platform 103 may include or be associated with a model database 115 and an index database 117. The model database 115 may include the models that are compared to the latent vectors of the processed media to determine the one or more objects associated with the media. The models may be latent vectors of known media that have been factorized using one or more latent parameters. By way of example, a media of a known topic, and only the known topic, may be factorized using one or more latent parameters to build a model for the known topic. The model database 115 may also include the one or more topics and/or objects that are associated with the models. The index database 117 may store the indexed latent vectors associated with the media. In one embodiment, the index database 117 stores the indexed latent vectors without storing the associated media. Thus, in such an embodiment, the index database 117 also includes one or more links (e.g., URLs, URIs) to the respective media associated with the indexed latent vectors. In one embodiment, the index database 117 stores the indexed latent vectors associated with the media, and the media itself, rather including links to the media. In one embodiment, the index database 117 can store the topics determined such as the name of one or more topics, based on matching between latent vectors of the media and known models, negating the need to store the latent vectors.

The system 100 also includes a services platform 107 and content providers 113*a*-113*n* (collectively referred to as content providers 113). The services platform 107 includes one or more services 109*a*-109*n* (collectively referred to as services 109). The services 109 may include one or more social networking services, one or more content provisioning services (e.g., media provisioning services), one or more information provisioning services (e.g., context information, metadata information, etc.), and the like. The content providers 113 can provide content to the UE 101, the media platform 103 and the services 109 of the services platform 107. The content may include, for example, the media that is indexed by the media platform 103, media used by the services platform 107, and media from or for the UE 101.

By way of example, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the media platform 103 processes the media to determine one or more latent parameters associated with the media. The latent parameters can be human recognizable, computer recognizable, or a combination thereof. The media platform 103 determines the latent vectors associated with the media based on the latent parameters.

In one embodiment, the media may be associated with metadata. The metadata, for example, may be automatically generated by the device that created the media. By way of example, metadata may provide information regarding the context and characteristics of the media, such as the length, size, encoding, location, time, date, orientation, depth of field associated with the metadata. The type and kind of metadata may vary according to the type and kind of media associated with the metadata. The media platform 103 may process the media to determine the metadata associated with the media. Upon determining the metadata, the media platform 103 may index the media based on the metadata. By way of example, the media may be indexed according to the time of day, date (e.g., season), location, depth of field, direction, etc. By indexing the media according to the metadata, along with according to the latent factors, the media platform 103 allows user to include additional characteristics by which to choose from to query the media.

In one embodiment, the media platform 103 processes the media to determine one or more segments associated with the media. By way of example, where the media is a video, the media platform 103 may process the video determine the number of different scenes that exist in the video, which potentially concern different topics and/or objects. For instance, a video may include mountains in one scene and a river in another scene. By way of example, where the media is an image, the media platform 103 may process the image to determine one or segments within the image that concern different objects. For instance, one segment of the image may concern mountains and another segment of the image may concern a tree.

The media platform 103 determines the various segments associated with the media and, for each segment, determines one or more latent vectors associated with the specific segment based on one or more latent parameters associated with the segment. Next, the media platform 103 compares the segment latent vectors with the one or more models. The media platform 103 can determine the topics and/or objects associated with the specific segments of the media. The media platform 103 may also index the determined segments and/or the media based on the segment latent vectors according to the comparison of the segment latent vectors with the models.

In one embodiment, where the media platform 103 determines one or more segments of the media, the media may also contain metadata. The metadata may not apply to the entire media, such that the metadata does not apply to all of the segments. In which case, the media platform 103 may synchronize at least part of the metadata with one or more of the determined segments of the media and/or one or more segment latent vectors associated with the media. After synchronizing the metadata with the segments, the media platform 103 may index or cause an indexing of the one or more segments based on the synchronized metadata.

By way of example, where the media is a video that includes two scenes, one of a mountain and one of a river, the metadata may include orientation information associated with the mountain scene and the river scene. The media platform 103 may determine that the scene with the mountain and the scene with the river are two different segments. The media platform 103 then may determine what metadata belongs to what scene. For instance, the mountain scene may have been filmed while the camera was pointing north, and the river scene may have been filmed while the camera was pointing south. The media platform 103 may associate the north metadata with the mountain scene and the south metadata with the river scene and index the scenes accordingly.

In one embodiment, the media platform 103 may determine metadata based on one or more objects contained in the media in correlation with metadata associated with the models and/or the objects associated with the models. The media platform 103 may determine that a latent vector associated with media matches a model that is associated with an object that has known metadata. For example, the object may be a well-known landmark. The media platform 103 may therefore index the media based on the metadata associated with the landmark, regardless of whether the media was created with the metadata.

By way of example, the media may be an image that includes the Eiffel Tower. The media platform 103 also may include a model that represents the Eiffel Tower. The model may also be associated with metadata associated with the Eiffel Tower, such as the location information of the Eiffel Tower. If the media platform 103 determines that the image matches the model associated with the Eiffel Tower, because the Eiffel Tower is in the image, the media platform 103 also may associate, for instance, the location information of the Eiffel Tower with the image based on the stored metadata associated with the model associated with the Eiffel Tower. Therefore, the media platform 103 may provide metadata to the media where the models include metadata.

In one embodiment, the media platform 103 may include one or more models that are associated with advertising information. Upon processing media that includes one or more representations of a specific object, if the media matches, at least in part, one or more models representing the specific object, and the specific object is associated with advertising information, the media platform 103 may index the media as being associated with the advertising information. In one embodiment, the media platform 103 may also overlay advertising information over the media such that, once a user is presented the media in response to a query, the advertising information is overlaid on the media.

By way of example, the media platform 103 may process a video a determine that a trademark or service mark is contained in the video based on comparing the latent parameters and/or latent vectors associated with the video to one or more models associated with the trademark or service mark. The media platform 103 may index the media based, at least in part, on the trademark or service mark. Further, the media platform 103 may overlay information associated with the trademark or service mark over the video. Thus, when another user is presented the video based on a query, whether or not the query is regarding the trademark or the service mark, the video presents the additional information associated with the model representing the trademark or service mark.

By way of example, the UE 101, the media platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the ISO Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the ISO OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the ISO OSI Reference Model.

Figure 2:
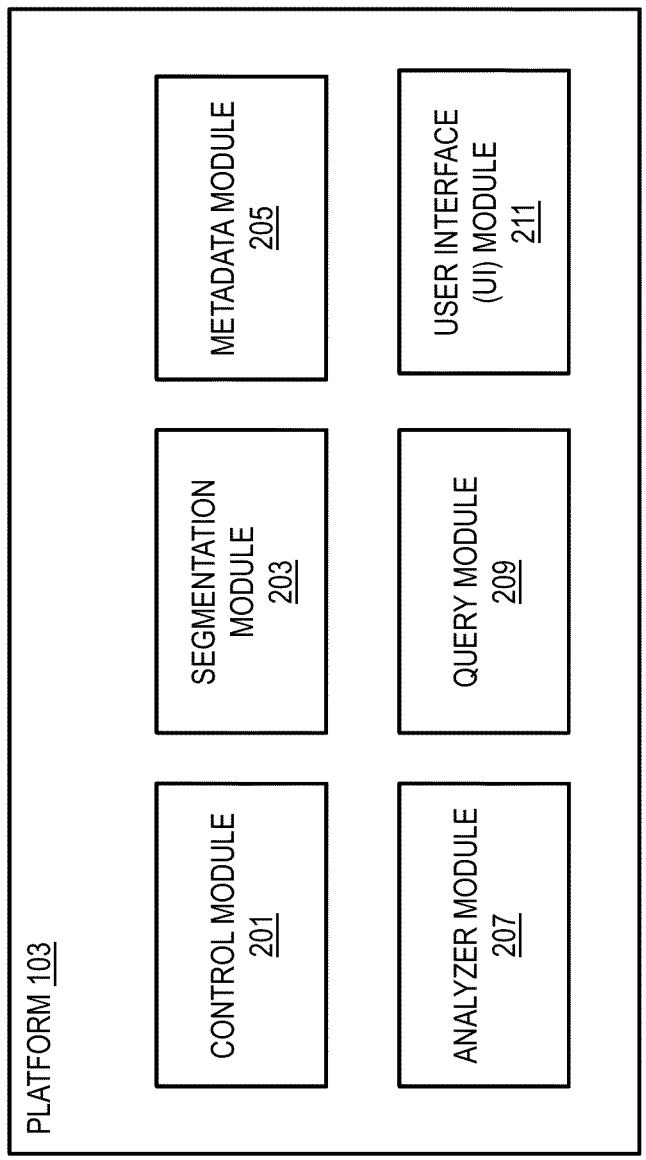
FIG. 2 is a diagram of the components of a media platform, according to one embodiment.

FIG. 2 is a diagram of the components of the media platform 103, according to one embodiment. By way of example, the media platform 103 includes one or more components for querying media based on characteristics associated with the media. It is contemplated that the functions of these components may be combined in one or more components or performed by other components of equivalent functionality. In this embodiment, the media platform 103 includes a control module 201, a segmentation module 203, a metadata module 205, an analyzer module 207, a query module 209 and a user interface (UI) module 211.

The control module 201 executes at least one algorithm for executing functions of the media platform 103. For example, the control module 201 may execute an algorithm for processing a query associated with a UE 101 for media associated with a certain location. By way of another example, the control module 201 may execute an algorithm to interact with the segmentation module 203 to cause segmentation of media. The control module 201 also may execute an algorithm to interact with the metadata module 205 to determine the metadata associated with media. The control module 201 also may execute an algorithm to interact with the analyzer module 207 to analyze media.

The segmentation module 203 segments the media into one or more segments depending on deviations within the media. For media such as video, deviations may occur from one set of frames to another based on changing scenes. For media such as images, deviations may occur from one grouping of pixels to another grouping of pixels. In one embodiment, the segmentation module 203 may use deviation thresholds and/or metadata changes to determine a deviation. Where the segmentation module 203 determines a segment in the media, each segment is treated as separate and is separately processed.

By way of example for video media, the segmentation module 203 may skip N number of frames between two analyzed frames to check for a deviation. If no deviation is observed, the segmentation module 203 will move on to the next frame separated by N number of frames. If, instead, a deviation is observed that is above a set threshold, the segmentation module 203 will revert back to t−N/2 frames, where t is the position of the current frame. If $f(A(t-N/2)-f(A(t))>p$, where f is the analysis function, A(t) represents the frame characteristics at position t and p is the threshold, then the distance is decreased to A (t−N/4) and so forth until the deviation is <p (e.g., less than the threshold deviation). Thus, for example, the frame where scene segmentation occurs is found through an iterative process. A similar process may be used where the media is an image based on, for example, one or more pixels and/or sets of pixels rather than frames.

The foregoing segmentation process may be combined with metadata related to changes were available to reinforce the segmentation process. Alternatively, changes in metadata, alone, may be used to determine segmentation. Such as, for example, where location, time, date, orientation, depth of field, etc. change from one scene to another.

The metadata module 205 processes metadata associated with the media. Current metadata structures provide information on media such as length, encoding, location, time, date, depth of field, orientation, etc. Such metadata may be applicable for the entire media, and some metadata may be applicable for part of the media. By way of example, location may be constant across a single video. However, metadata such as orientation, depth of field, white balance, etc. may vary within the media between segments of the media. The metadata module 205 processes and extracts the metadata from the media.

In one embodiment, the metadata module 205 makes higher level inferences from a metadata stream along with timing and frame information, where applicable. Where applicable, the metadata module 205 synchronizes between extracted segments of the media and metadata. For example, in certain instances, there could be a mismatch between timing information extracted by the metadata module 205 for segments and between extracted segments from the segmentation module 203. The metadata module 205 re-negotiates the extracted media and the extracted metadata based on, for example, a metadata timing stream or additional analysis regarding the objects associated with the media. Thus, the metadata module 205 outputs a set of fully segmented and metadata synchronized segments of the media for further analysis.

The analyzer module 207 analyzes the media to determine the latent vectors used in indexing the media and the associated metadata. The analyzer module 207 transforms or collapses parameter space of the media and/or segments of the media into a sub-parameter space as a representational vector that is stored in the index database 117. The analyzer module 207 receives the media and/or segments of the media and processes the media to build one or more latent vectors associated with the media based on cluster patterns represented by latent parameters. By way of example for video media, the analyzer module 207 receives one or more segments of a video and processes each segment individually. The analyzer module 207 processes consecutive frame sets, with the set size being a pre-defined number, and builds a latent vector representing cluster patterns or scene patterns represented by one or more latent parameters. The latent parameters may be human recognizable and/or machine (e.g., computer) recognizable. In one embodiment, the number of latent parameters used in building the latent vector is the same as the number of latent parameters used in building the latent vectors of the known topics (models). In one embodiment, for video, the analyzer module 207 may create a latent vector for each frame and average the latent vectors over the entire segment (e.g., scene) to determine one or more latent vectors associated with the entire segment. In one embodiment, the analyzer module 207 interfaces with the segmentation module 203 and/or the metadata module 205 to also index the media and/or segments of the media based on the metadata information, such as location, orientation, depth of field, etc.

In one embodiment, the analyzer module 207 also performs a similarity analysis. The analyzer module 207 searches, for example, the model database 115, the index database 117, or a combination thereof to find n number of most similar latent vectors as the latent vector associated with the media and/or segment of media being processed. The similarity between the latent vectors may be determined based on, for example, the distance found between latent vectors according to a matching process (e.g., Cosine distance calculation), metadata match, or a combination of thereof. In one embodiment, the analyzer module 207 may determine multiple match sets based on different criterion and/or parameters and thus create one or more similarity indexes for each latent vector analyzed.

In one embodiment, the media platform 103 can store latent vectors associated with standard object and/or scene information related to, for example, mountains, rivers, forests, buildings, etc. as the models in the model database 115. Based on the distance between the latent vectors being analyzed and the latent vectors associated with the standard objects (e.g., models), a classification and indexing of the latent vectors associated with the media being analyzed can be performed through matching against the model latent vectors. In one embodiment, the latent vectors associated with the models and/or objects represented by the models stored in the model database 115 are derived through a set of media that were previously manually tagged as containing certain properties with respect to any standard topology definition and factorized using latent parameters.

In one embodiment, the media platform 103 by way of the analyzer module 207 allows for a learning process where the indexed latent vectors generated from processing media are used to index additional media in conjunction with the models. Thus, by way of example, if media is analyzed as being associated with a forest based on the stored model associated with a forest, the analyzer module 207 may subsequently use both the model associated with the forest and the media that was analyzed as being associated with a forest to process additional media based on the latent vectors. Thus, the analyzer module 207 allows for the media platform 103 to continuously learn and update the processing to more accurately reflect the topics, objects and scenes that are associated with the media, starting from pre-defined models and using subsequently processed media and the associated latent vectors.

In one embodiment, the analyzer module 207 relies on building a unique signature for the media that is based on signal properties. Upon receiving the media and/or segments of the media, the analyzer module 207 extracts feature coefficients that act as a signature for the media. The analyzer module 207 may then map the feature coefficient signature to one or more sets of topics through a simple match process where patterns have already been mapped to topics through a learning process.

In one embodiment, the analyzer module 207 uses a Label Latent Dirichlet Allocation (LLDA) (e.g., supervised LDA) clustering process that clusters data along topic distribution into sets of topics where the topics themselves are known based on one or more models. These sets of topics are based on frequency of similar data occurring within the corpus. Thus, in one embodiment, the LLDA process involves labeling a latent topic that has been pre-clustered. Once a latent pattern has been labeled, the models associated with the LLDA process whose topics are known can be used for clustering content along the particular labels/models. Thus, a pattern of latent parameters associated with the media can be obtained that indicates how much a model is contained with the distribution. Such a modeling of media using pre-labeled models gives a unique distribution pattern of pre-modeled topics that act as a unique signature built upon know latent distributions. In one embodiment, the granularity of the models can increase to the extent that smaller and smaller objects and/or topics can be determined based on the latent vectors. By way of example, the granularity of the model may be increased such that individual leafs can be distinguished in a picture of a forest.

The query module 209 receives one or more queries for media and determines the media that satisfy the query. The query module 209 interfaces with the user interface module 211 to render the presentation of the user interface for querying the media and for presenting the results of the query. In one embodiment, applications 111 interfacing with the media platform 103 interface with the query module 209 to query a backend service associated with the media platform 103. The query module 209 may provide a sequential query interface, a semantical query interface, a RESTful interface, or the like. The query module 209 queries the index database 117 for the media that are associated with a selection by the user. The query module 209 causes a querying of the index for the one or more media, the one or more segments of media, or a combination thereof based on a selection of a user. In one embodiment, the query module 209 queries the media based on one or more latent vectors associated with the media. By way of example, a user makes a selection of one or more latent vectors associated with a model, an object represented by a model, or a combination thereof by selecting a topic and/or the object represented by the model. The query module 209 then searches the index database 117 for one or more latent vectors associated with the indexed media that match the one or more latent vectors associated with the selected models and/or objects represented by the models.

In one embodiment, the query module 209 accepts further details regarding the specific media that a user is searching for and can accept details that are associated with the latent parameters and metadata used to index the media. By way of example, the query module 209 accepts details such as presence of individuals in the media, time, date, season, orientation, depth of field, type of scenery, etc.

The UI module 211 causes a rendering of a user interface associated with determining a selection of at least one of the one or more models, one or more objects represented by the one or more models, one or more characteristics associated with the models and/or objections, or a combination thereof. By way of example, the UI module 211 can render a user interface associated with a map covering a location (e.g., a part of the world, a country, a city, etc.). A user may then select one or more specific locales associated with the location to query for media associated with the location. Upon determining one or more media that are associated with the selected models and/or objects associated with the models, the UI module 211 presents the one or more media. In one embodiment, the UI module 211 presents the results overlaid on the rendering of a map to illustrate the location of the results with respect to the map. The UI module 211 can present further user interfaces, as described below with respect to FIGS. 6A-6D.

Figure 3:
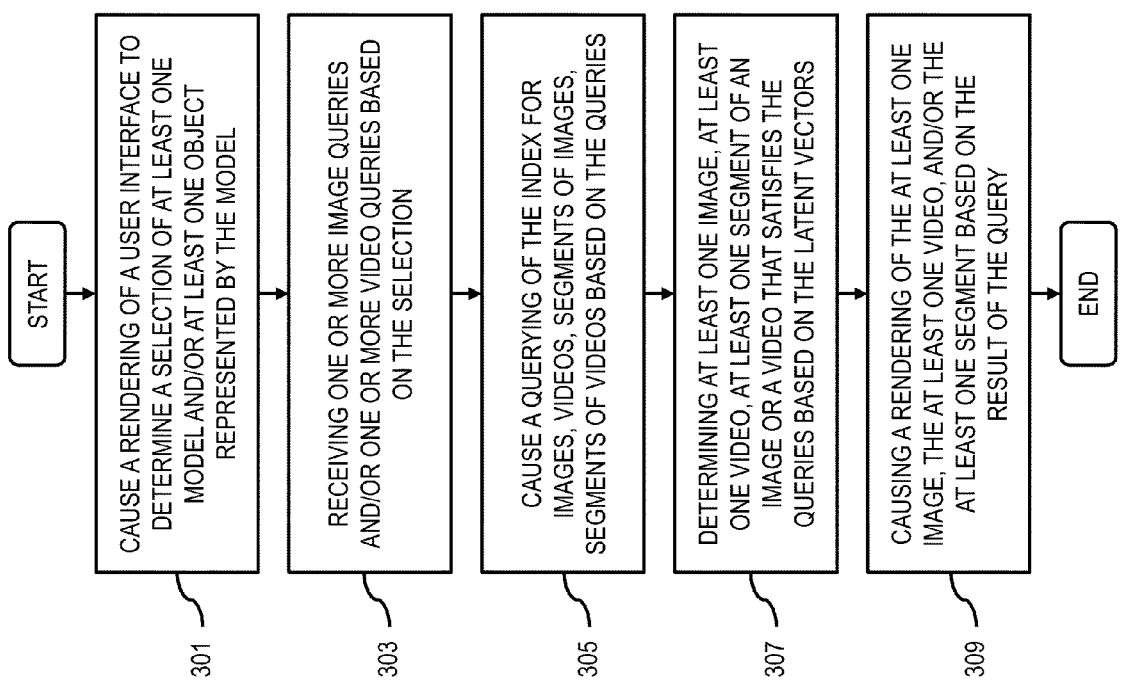
FIG. 3 is a flowchart of a process for querying media based on characteristics associated with the media, according to one embodiment.
Figure 8:
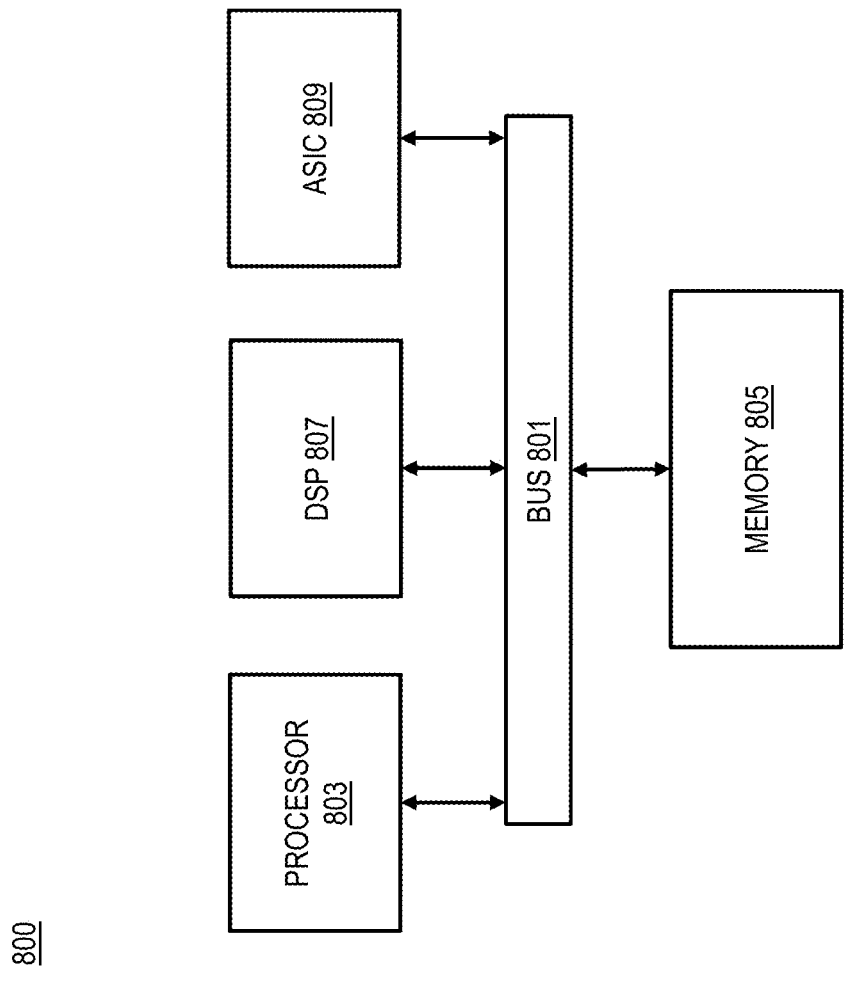
FIG. 8 is a diagram of a chip set that can be used to implement an embodiment of the invention.

FIG. 3 is a flowchart of a process 300 for querying media based on characteristics associated with the media, according to one embodiment. In one embodiment, the media platform 103 performs the process 300 and is implemented in, for instance, a chip set including a processor and a memory as shown in FIG. 8. In step 301, the media platform causes a rendering of a user interface to determine a selection of at least one model, at least one object represented by the model, and/or one or more characteristics associated with the media. In one embodiment, the rendering of the user interface may be graphical, textual, or a combination thereof. By way of example, in one embodiment, the user interface may include a rendering of a map. The map may be associated with a country, a state, a city, a boundary around specific coordinates, etc. Accordingly, a user may query for media associated with the specific location. For example, a user looking for a video of a fjord in Norway may select a map of Norway and select a portion of the map that is associated with fjords. Accordingly, the media that is returned will likely be associated with fjords based on the location of the map.

In one embodiment, the rendering may permit a user to filter the selection of a model and/or an object represented by a model based on any characteristic used to index the media, such as any human recognizable characteristic, latent parameter and/or metadata. By way of example, the rendering of the user interface (e.g., a map) may allow a user to filter the media based on the level of light associated with the media, whether users are contained and/or associated with the media, the season associated with the media, a depth of field associated with the media, a time associated with the media, orientation of the media, or any combination thereof.

In step 303, the media platform 103 receives one or more media queries based on the selection of the user in response to the rendering of the user interface. In one embodiment, the query may correspond to a selection of a location, or a boundary of a location associated with a map, and a text string describing the queried media. In one embodiment, the query may not be related to a specific location but may instead include all of the locations that are indexed and associated with the media. In one embodiment, the query includes one or more models and/or one or more objects represented by the models that the user is interested in for the query. By way of example, the user may be interested in media associated with mountains. Thus, the user may have selected one or more models that represent mountains. The media platform 103 receives the query and receives the indication of the models representing the mountains.

In step 305, the media platform 103 causes a querying of, for example, the index database 117 for media that satisfies the queried selection. The media platform 103 searches the index database 117 for the media that satisfies the parameters used in the query. For example, if the query is for videos associated with the topic of mountains associated with a certain location or a boundary of the location, the media platform 103 searches the index database 117 for the media that satisfy the topic of mountains and the location criteria.

In step 307, the media platform 103 determines all of the media that satisfy the query. By way of example, a query may be associated with a certain location as provided for based on a selection associated with a map. In one embodiment, the media platform 103 determines the media that satisfy the query based on the latent vectors and/or the metadata associated with the media. In one embodiment, metadata associated with the media indicates the location associated with the media. Further, one or more latent parameters or latent vectors associated with the media may associate the media with an orientation, a depth of field, etc. Thus, in one embodiment, based on the topic the user selected and/or the object the user selected, the latent vectors used to index the media according to the models and/or the objects the models represent allow the media platform 103 to select the media that satisfy the user's selection.

In step 309, the media platform causes a rendering that presents the media based on the results of the query. The rendering may present the media based on one or more textual descriptions of the media, may present the media based on one or more graphical representations of the media, or a combination thereof. By way of example, when a location is used to query and/or filter the media, the media may be rendered with respect to the graphical representation. By way of example, the media may be presented according to the specific locations associated with the media with respect to a map covering the area.

Figure 4:
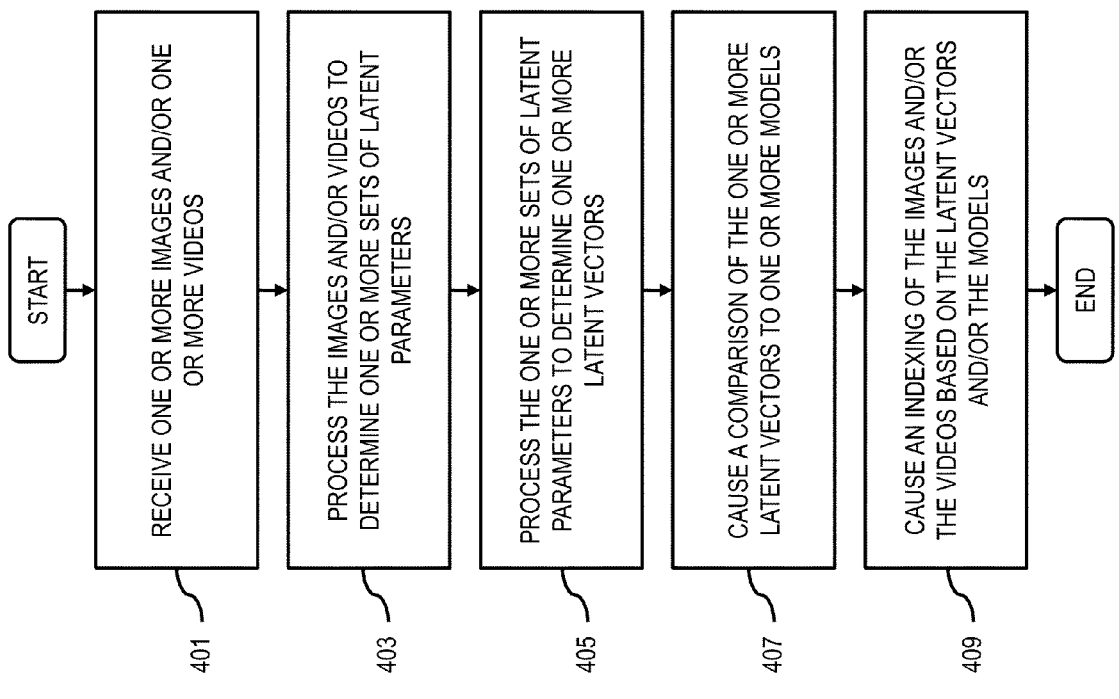
FIG. 4 is a flowchart of a process for indexing media according to latent vectors associated with the media, according to one embodiment.

FIG. 4 is a flowchart of a process 400 for indexing media according to latent vectors associated with the media, according to one embodiment. In one embodiment, the media platform 103 performs the process 400 and is implemented in, for instance, a chip set including a processor and a memory as shown in FIG. 8. In step 401, the media platform 103 receives one or more media for processing. The media may represent, for example, one or more images and/or one or more videos. The media may originate from a user, one or more other users, one or more services 109 from the services platform 107, and one or more content providers 113, etc. By way of example, the user of the UE 101 may upload one or more images and/or one or more videos acquired using the UE 101 to the media platform 103. The user of the UE 101 may also upload one or more images and/or one or more videos using the UE 101 to a service 109a on the services platform 107, which may send the images or video to the media platform 103 for indexing.

In step 403, the media platform 103 processes the media to determine one or more sets of latent parameters associated with the media. As discussed above, the one or more sets of latent parameters define cluster patterns and/or scene patterns associated with the media. The latent parameters may be human recognizable, machine (e.g., computer) recognizable, or a combination thereof.

In step 405, the media platform 103 processes the one or more sets of latent parameters to determine one or more latent vectors. The media platform 103 transforms or collapses the scene parameter space into a sub-parameter space as a representational vector based on the parameters. Thus, the latent vectors denote a clustering of the patterns for the media. In one embodiment, the media platform 103, where the media is associated with a video, may create latent vectors based on the latent parameters for every frame associated with the video. The media platform 103 can then average the latent vectors for the various frames to determine a latent vector associated with the entire media and/or segments associated with the media.

In step 407, the media platform 103 causes a comparison of the one or more latent vectors to one or more models. In one embodiment, the comparison may be based on a signal-processing approach where a unique signature is built for the media based on signal properties. Feature coefficients are extracted for the media and act as a signature for the media. The feature coefficients may be mapped to one or more sets of topics through a match process where patterns have already been mapped to topics through a learning process. In one embodiment, the media platform 103 uses a Label Latent Dirichlet Allocation clustering process for the comparison that clusters data along topic distribution into sets of topics where the topics themselves are known based on one or more models. The LLDA process involves labeling a latent topic that has been pre-clustered. Once a latent pattern has been labeled, the models associated with the LLDA process whose topic is known can be used for clustering content along the particular labels/models.

In one embodiment, based on the comparison, the media platform 103 can associate the media or segment of the media that is being processed with metadata associated with a model and/or an object represented by a model based on known metadata associated with the model and/or object represented by the model. By way of example, a model and/or an object represented by a model may represent a specific object, such as a specific landmark. Information regarding the landmark may already be known, such as the location of the landmark. If, in comparing the latent vectors of the media to the models, the media platform 103 determines a match between the latent vectors of the media to a model representing a landmark, the media platform 103 may automatically associate the metadata information of the landmark with the media. Therefore, for instance, if an image includes a picture of the Eiffel Tower, the media platform 103 may automatically associate the location of the media as Paris, France regardless of whether the media includes metadata indicating that the image was taken in Paris, France.

Further, in one embodiment, information may be associated with the media for subsequent processing of the media with the additional information. The information may include additional media that may be overlaid over the original media based on the original media including one or more latent vectors associated with one or more models and/or one or more objects represented by the models. By way of example, where a video includes a trademark that is detected by one or more latent vectors, the video may be associated with information that is associated with the trademark, such as advertisements associated with the trademark. Accordingly, in subsequent processing, the media platform 103 may overlay the advertisements over the media when presented to users in the form of query results.

In step 409, the media platform 103 causes an indexing of the media based on the latent vectors and/or models associated with the latent vectors based on the comparison. In addition, where the media platform 103 associated the media with a model and/or an object represented by a model that included metadata information, the media platform 103 may index the media based on the metadata information. By way of example, where the media platform 103 associated an image with the Eiffel Tower, the media platform may index the image based on the location Paris, France.

Figure 5:
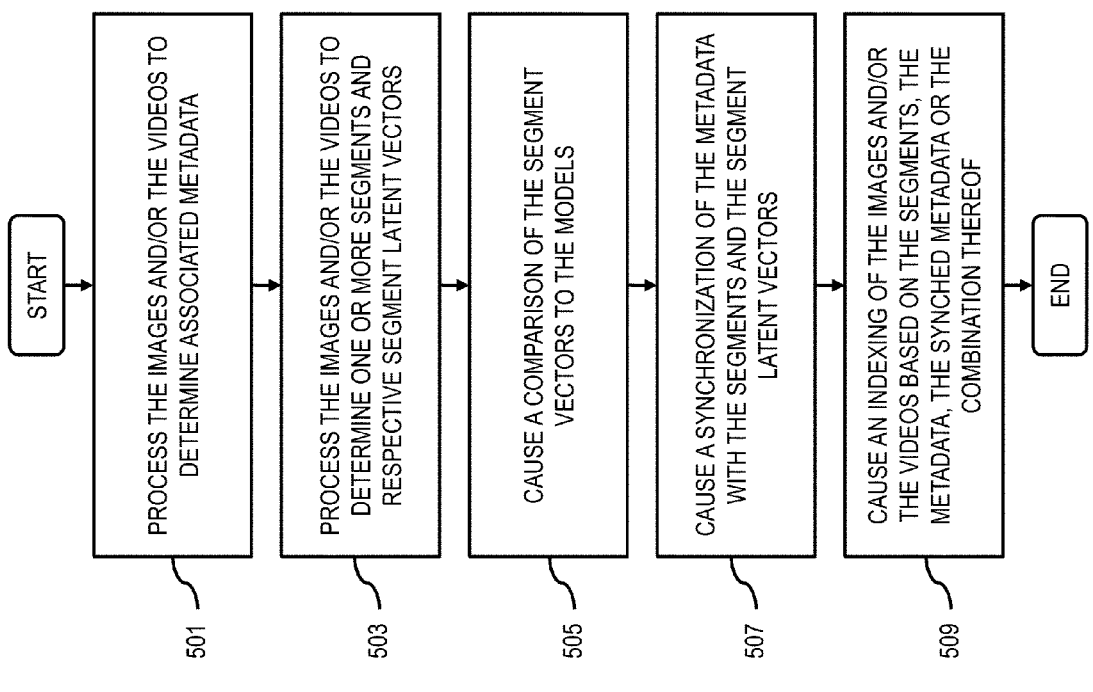
FIG. 5 is a flowchart of a process for indexing segments of the media based on metadata associated with the media, according to one embodiment.

FIG. 5 is a flowchart of a process 500 for indexing segments of the media based on metadata associated with the latent vectors, according to one embodiment. In one embodiment, the media platform 103 performs the process 500 and is implemented in, for instance, a chip set including a processor and a memory as shown in FIG. 8. In step 501, the media platform 103 processes the media to determine metadata associated with the media. By way of example, most media now includes some form of metadata that describes, for example, aspects of the media, aspects of how the media was captured, aspects regarding the device that was used to capture the media, context information associated with the media, and so forth. As devices become more sophisticated, the amount of metadata that may be associated with the media increases. For example, devices now can determine their location and the orientation the device is in when acquiring the media. Thus, the device may associate the media with the specific orientation information. Devices such as digital cameras also associate the settings of the camera with the media. For example, the settings such as the ISO, white balance, aperture, focal length, etc. may be associated with the media acquired by the camera. The media platform 103 acquires this information to further index the media based on the metadata.

In step 503, the media platform 103 processes the media to determine one or more segments associated with the media. The segments may be related to deviations in the media based on one or more deviation thresholds. The deviations may be determined based on the latent parameters and/or of the metadata associated with the media. By way of example for videos, the deviation may be determined by analyzing the frames of the video to determine a deviation that exceeds a pre-defined threshold from one frame to the next. In one embodiment, a deviation is checked for between frames separated by N number of frames. Where a deviation is not detected, a deviation is checked for between the next frame separated by N number of frames. Where a deviation is detected, the analysis reverts back to t−N/2 frames, where t is the position of the current frame. If $f(A(t-N/2)-f(A(t))>p$, where f is the analysis function, A(t) represents the frame characteristics at position t and p is the pre-defined threshold, then the distance is decreased to $A(t-N/4)$ and so forth until the difference is <p (e.g., no longer greater than a threshold deviation). Thus, for example, the frame where scene segmentation occurs is found through an iterative process. A similar process may be used where the media is an image based on, for example, one or more pixels and/or sets of pixels rather than frames.

In one embodiment, the metadata may be used to determine a deviation in the media. By way of example, for a video, where the metadata changes based on, for example, location, time, and/or date by a pre-defined threshold, the media platform 103 may determine that there is a deviation in the media. After determining one or more segments of the media, the media platform 103 determines the latent vectors associated with the segments based on the same process described above with respect to the media, except for performing the processing with respect to only the segment.

In step 505, the media platform 103 causes a comparison of the segment latent vectors with the models according to the process described above with respect to the media as a whole, except the comparison is performed with respect to only the segment. Thus, in one embodiment, by way of example, where a media is associated with a video including many different scenes, one scene regarding mountains may be determined as a segment of the video and the scene is compared to one or more models to determine that the scene is associated with the topic of mountains. Accordingly, although the video as a whole may not have been determined to be about the topic of mountains (e.g., based on the proportion of mountains in the video with respect to other objects), the specific portion of the video that corresponds to the scene is determined to concern mountains.

In step 507, the media platform 103 may cause a synchronization of the metadata with the determined segments and/or segment latent vectors. Some of the metadata associated with the media may apply to the entire media, such as location, date, time, etc. However, some of the metadata may apply to only a segment of the media, such as orientation, depth of field, etc. The media platform 103 in step 507 re-negotiates between the metadata module 205 and the segmentation module 203 regarding synchronizing the metadata with the determined segments. The re-negotiation may be based on a metadata stream that is re-negotiated with the timing information associated with the media. For example, a video may include metadata timing information associated with when the orientation and/or depth of field changed. This timing information can be negotiated with the timing information of when images related to the video were captured to determine what metadata applies to what segments of the media. Accordingly, based on the synchronization, the media platform 103 associates the correct metadata with the correct segment.

In step 509, the media platform 103 causes an indexing of the media based on the one or more segments, the one or more segment latent vectors, the metadata, the synched metadata, or a combination thereof. Based on this indexing, the media platform 103 can provide one or more media more specifically associated with an object and/or a topic. By way of example, rather than presenting an image of, among other things, a forest in response to a query for an image of a forest, the media platform 103 can present the segment of the image that specifically concerns the forest only, without other objects in the forest. Additionally, by determining and indexing the media based on the associated metadata, the media platform 103 allows a user to search for media based on the parameters of the metadata, such as location, date, time, season, depth of field, orientation. Therefore, a user looking for a video for a specific location, at a specific orientation and depth of field can search specifically for that video based on the metadata.

Figure 6B:
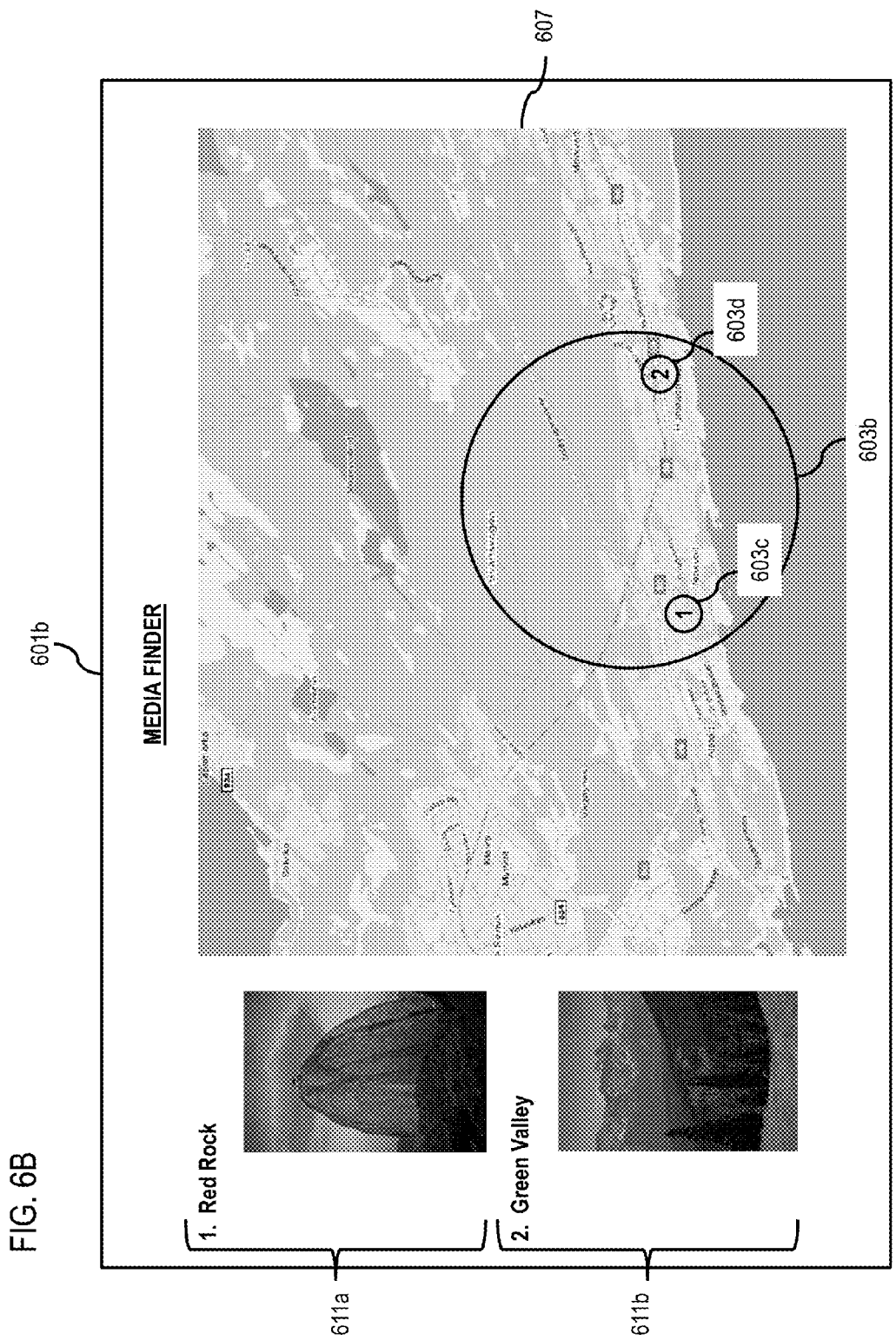

FIGS. 6A-6D are diagrams of user interfaces utilized in the processes of FIGS. 3-5, according to various embodiments. FIG. 6A illustrates an exemplary embodiment of the user interface 601a associated with a rendering of a user interface for determining a selection of media. The user interface 601a may be associated with one or more applications 111 executed by the UE 101 used to interface with the media platform 103. The user interface 601a allows a user to query for media by first selecting a location associated with the media according to indicator 603a. In one embodiment, rather than selecting a specific location, the user may select a boundary 603b for which the user would like the media to be within. The user can select a location associated with the media by using a cursor to select any region of the map 605. By selecting the region on the map, the user may narrow down the returned query results based on the location. The user can further filter the returned query results based on the indicator 607a that allows for the user to select certain metadata that the user wants to be associated with the returned media. As illustrated by indicator 607a, the user has selected to filter the media by time (e.g., 6 AM-9 AM) and date (e.g., summer). The user also selected at least one model and/or an object represented by the model by selecting mountains associated with indicator 607b. Thus, the media returned based on the query will be associated with the selected location on the map 603a (or 603b), will be associated with the metadata according to indicator 607a, and will be associated with the model and/or the object represented by the model according to indicator 607b. In one embodiment, the user interface 601a includes a text box 607c that allows a user to input text to further describe the media that the user is querying for by entering a description of the media. In one embodiment, when the user is ready for the media platform 103 (e.g., Media Finder) to query the index database 117, the user may select GO associated with the indicator 609.

In response to the query, FIG. 6B illustrates the user interface 601b associated with the returned media based on the query. By way of example, media 611a and 611b represent returned media results that are associated with the boundary 603b selected by the user on the map 605, filtered according to the time and date, and associated with the model and/or the object represented by the model of mountains as described with respect to FIG. 6A. Indicators 603c and 603d illustrate on the map 605 where the media 611a and 611b were created, respectively, which, as illustrated, is within the boundary 603b. Using the user interface 601b, the user may select one or more of the query results (e.g., 611a and 611b) to use in one or more applications.

FIG. 6C illustrates the user interface 601c associated with the media platform 103 when uploading content to the media platform 103, or a service 109 or content provider 113 going through the media platform 103, for analysis of the uploaded media. Indicator 613a illustrates that the media being uploaded is a video (e.g., .mpg) titled mountains. The video may appear to be associated with mountains based on the user who created the video determining the filename. However, upon processing the video, the media platform 103 may, for example, determine that the video is associated with two video segments, Scene 1 and Scene 2. The media platform 103 may determine the two segments based on the discussion above with respect to deviations in the frames of the video. For example, based on a change in the metadata and/or a deviation in the latent parameters between frames of Scene 1 and Scene 2 that exceeded a set threshold, the media platform 103 may determine that the video includes two segments.

The user interface 601c may include still frame shots 615a and 615b associated with the two video segments Scene 1 and Scene 2, respectively. As illustrated by the still frame shots 615a, Scene 1 does in fact include mountains as objects in the video. However, as illustrated by still frames shots 615b, Scene 2 includes a biker but does not necessarily include mountains (e.g., the first frame of Scene 2 does not include mountains). Thus, Scene 1 may be indexed according to the topic of mountain, and Scene 2 may be indexed according to the topic of, for example, biking.

FIG. 6D illustrates the user interface 601d associated with the media platform 103 when uploading content to the media platform 103, or a service 109 or content provider 113 going through the media platform 103, for analysis of the uploaded media. Indicator 613b illustrates that the media being uploaded is an image (e.g., .jpg) titled Paris; therefore, the image may be associated with Paris. As seen by indicator 617, the image is associated with the Eiffel Tower. Based on the media platform 103 including a model specific for the object of the Eiffel Tower, the media platform 103 is able to recognize the topic of the image and associate the image with metadata stored in the model database 115 associated with the object of the Eiffel Tower. For example, the metadata may include the location of the image based on the location of the Eiffel Tower. In one embodiment, the media platform 103 may prompt the user regarding the accuracy of the determination of the object and/or topic associated with the image according to indicator 619*a*. Thus, the user may indicate if the media platform 103 is correct or incorrect. Depending on the input from the prompt associated with indicator 619*a*, the media platform 103 can update the model associated with the Eiffel Tower for better accuracy of the object and/or the topic determination in subsequent processing of media. Further, the user interface 601*d* may include indicator 619*b* that allows the user to select whether to associate the image with metadata associated with the Eiffel Tower. If the user selects to associate the metadata with the image, the image may be indexed based on, for example, the location of the Eiffel Tower regardless of whether the image actually contained such metadata.

The processes described herein for querying media based on characteristics associated with the media may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
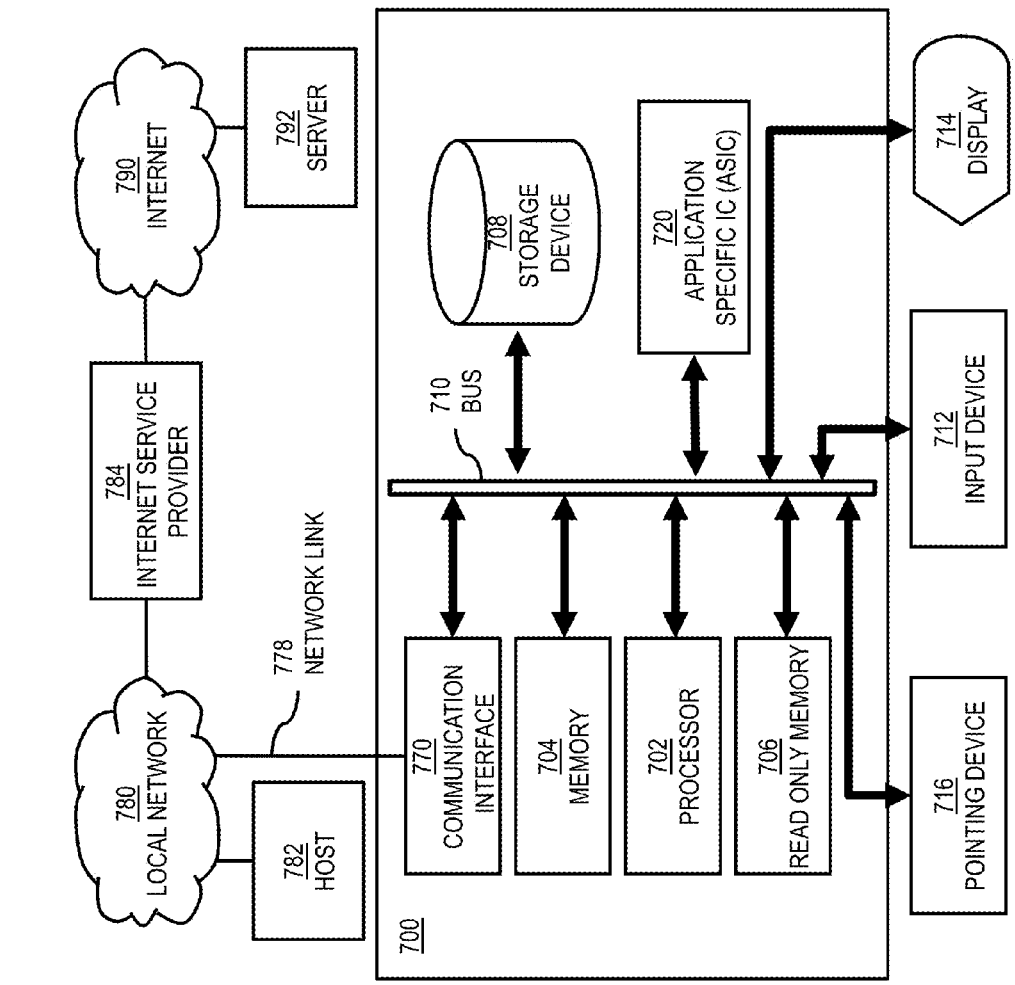
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to query media based on characteristics associated with the media as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of querying media based on characteristics associated with the media.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to querying media based on characteristics associated with the media. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for querying media based on characteristics associated with the media. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for querying media based on characteristics associated with the media, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for querying media based on characteristics associated with the media at the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to query media based on characteristics associated with the media as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of querying media based on characteristics associated with the media.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to query media based on characteristics associated with the media. The memory 805 also stores the data associated with or generated by the execution of the inventive steps.

Figure 9:
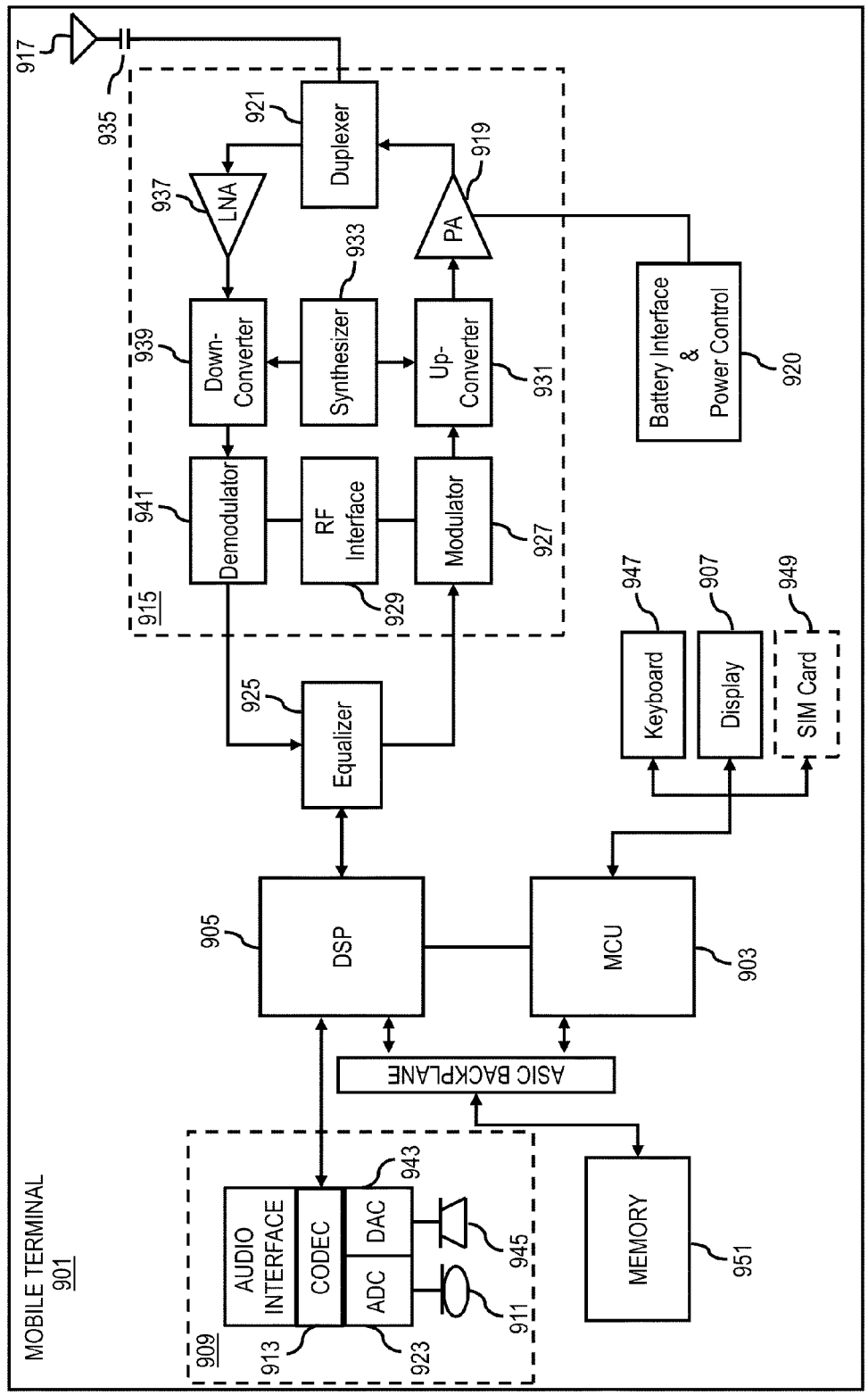
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of querying media based on characteristics associated with the media. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of querying media based on characteristics associated with the media. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to querying media based on characteristics associated with the media. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of or processing (1) data or (2) information or (3) at least one signal, the (1) data or (2) information or (3) at least one signal based, at least in part, on the following:

a processing of one or more images, one or more videos, one or more segments of the one or more images, one or more segments of the one or more videos, or a combination thereof to determine one or more media latent vectors associated with the one or more images, the one or more videos, the one or more segments of the one or more images, the one or more segments of the one or more videos, or the combination thereof;

a processing of the one or more images, the one or more videos, the one or more segments of the one or more images, the one or more segments of the one or more videos, or the combination thereof to determine metadata associated with the one or more images, the one or more videos, the one or more segments of the one or more images, the one or more segments of the one or more videos, or the combination thereof;

an indexing of the one or more images, the one or more videos, the one or more segments of the one or more images, the one or more segments of the one or more videos, or the combination thereof based, at least in part, on the metadata;

a comparison of the one or more media latent vectors to one or more model latent vectors associated with one or more models,
wherein the one or more models are predetermined media,
wherein the one or more model latent vectors are based on a factorization of the predetermined media using one or more predetermined latent parameters; and an indexing to determine an index of indexed latent vectors associated with the one or more images, the one or more videos, the one or more segments of the one or more images, the one or more segments of the one or more videos, or the combination thereof based, at least in part, on the comparison.

2. A method of claim 1, wherein the (1) data or (2) information or (3) at least one signal are further based, at least in part, on the following:
a rendering of a user interface for determining a selection of at least one of the one or more models, one or more objects represented by the one or more models, or a combination thereof;
a querying of the index for the one or more images, the one or more videos, the one or more segments of the one or more images, the one or more segments of the one or more videos, or a combination thereof based, at least in part, on the selection; and
a rendering of one or more results of the query in the user interface,
wherein the one or more media latent vectors represent one or more objects and/or topics associated with the one or more images, one or more videos, one or more segments of the one or more images, one or more segments of the one or more videos, or a combination thereof.

3. A method of claim 1, wherein the (1) data or (2) information or (3) at least one signal are further based, at least in part, on the following:
a processing of the one or more images, the one or more videos, the one or more segments of the one or more images, the one or more segments of the one or more videos, or the combination thereof to determine one or more sets of latent parameters; and
at least one determination of the one or more media latent vectors based, at least in part, on the one or more sets of the latent parameters.

4. A method of claim 1, wherein the metadata includes location information, and the one or more images, the one or more videos, the one or more segments of the one or more images, the one or more segments of the one or more videos, or the combination thereof are indexed based, at least in part, on the location information.

5. A method of claim 1, wherein the (1) data or (2) information or (3) at least one signal are further based, at least in part, on the following:
a processing of the one or more images, the one or more videos, or the combination thereof to determine the one or more segments of the one or more images, the one or more segments of the one or more videos, or the combination thereof and respective segment latent vectors.

6. A method of claim 5, wherein the (1) data or (2) information or (3) at least one signal are further based, at least in part, on the following:
a synchronization of at least part of the metadata associated with the one or more segments of the one or more images, the one or more segments of the one or more videos, the one or more segment latent vectors, or a combination thereof; and
an indexing of the one or more segments based, at least in part, on the synchronized metadata.

7. A method of claim 1, wherein the (1) data or (2) information or (3) at least one signal are further based, at least in part, on the following:
at least one image, at least one video, at least one segment of at least one image, at least one segment of at least one video, or a combination thereof match at least one model associated with at least one landmark; and
an indexing of the at least one image, the at least one video, the at least one segment of the at least one image, the at least one segment of the at least one video, or the combination thereof based, at least in part, on the at least one landmark.

8. A method of claim 7, wherein the (1) data or (2) information or (3) at least one signal are further based, at least in part, on the following:
an association of the at least one image, the at least one video, the at least one segment of the at least one image, the at least one segment of the at least one video, or the combination thereof with metadata associated with the at least one landmark; and
an indexing of the at least one image, the at least one video, the at least one segment of the at least one image, the at least one segment of the at least one video, or the combination thereof based, at least in part, on the at least one landmark metadata,
wherein the landmark metadata includes location information, orientation information, or a combination thereof.

9. A method of claim 1, wherein the (1) data or (2) information or (3) at least one signal are further based, at least in part, on the following:
one or more image queries, one or more video queries, or a combination thereof; and
at least one image, at least one video, at least one segment of at least one image, at least one segment of at least one video, or a combination thereof that satisfies the one or more image queries, the one or more video queries, or the combination thereof based, at least in part, on the one or more media latent vectors.

10. A method of claim 1, wherein the (1) data or (2) information or (3) at least one signal are further based, at least in part, on the following:
determining at least one distance between the one or more media latent vectors and the one or more model latent vectors based on the comparison; and
matching at least one of the media latent vectors with at least one of the one or more model latent vectors based on the at least one distance, wherein the indexing is further based on the matching.

11. An apparatus comprising:
at least one processor; and
at least one memory including computer program code for one or more programs,
the at least one memory and the computer program code configured to, with the at least one processor, cause the apparatus to perform at least the following, process or facilitate a processing of one or more images, one or more videos, one or more segments of the one or more images, one or more segments of the one or more videos, or a combination thereof to determine one or more media latent vectors associated with the one or more images, the one or more videos, the one or more segments of the one or more images, the one or more segments of the one or more videos, or the combination thereof, process or facilitate a processing of the one or more images, the one or more videos, the one or more segments of the one or more images, the one or more segments of the one or more videos, or the combination thereof to determine metadata associated with the one or more images, the one or more videos, the one or more segments of the one or more images, the one or more segments of the one or more videos, or the combination thereof, cause, at least in part, an indexing of the one or more images, the one or more videos, the one or more segments of the one or more images, the one or more segments of the one or more videos, or the combination thereof based, at least in part, on the metadata, cause, at least in part, a comparison of the one or more media latent vectors to one or more model latent vectors associated with one or more models, wherein the one or more models are predetermined media, wherein the one or more model latent vectors are based on a factorization of the predetermined media using one or more latent parameters, and cause, at least in part, an indexing to determine an index of indexed latent vectors associated with the one or more images, the one or more videos, the one or more segments of the one or more images, the one or more segments of the one or more videos, or the combination thereof based, at least in part, on the comparison to determine an index.

12. An apparatus of claim 11, wherein the apparatus is further caused to:

cause, at least in part, a rendering of a user interface for determining a selection of at least one of the one or more models, one or more objects represented by the one or more models, or a combination thereof, cause, at least in part, a querying of the index for the one or more images, the one or more videos, the one or more segments of the one or more images, the one or more segments of the one or more videos, or a combination thereof based, at least in part, on the selection, and cause, at least in part, a rendering of one or more results of the query in the user interface, wherein the one or more media latent vectors represent one or more objects or topics associated with the one or more images, one or more videos, one or more segments of the one or more images, one or more segments of the one or more videos, or a combination thereof.

13. An apparatus of claim 11, wherein the apparatus is further caused to:

process or facilitate a processing of the one or more images, the one or more videos, the one or more segments of the one or more images, the one or more segments of the one or more videos, or the combination thereof to determine one or more sets of latent parameters, and determine the one or more latent vectors based, at least in part, on the one or more sets of the latent parameters.

14. An apparatus of claim 11, wherein the metadata includes location information, and the one or more images, the one or more videos, the one or more segments of the one or more images, the one or more segments of the one or more videos, or the combination thereof are indexed based, at least in part, on the location information.

15. An apparatus of claim 11, wherein the apparatus is further caused to:

process or facilitate a processing of the one or more images, the one or more videos, or the combination thereof to determine the one or more segments of the one or more images, the one or more segments of the one or more videos, or the combination thereof and respective segment latent vectors.

16. An apparatus of claim 15, wherein the apparatus is further caused to:

cause, at least in part, a synchronization of at least part of the metadata associated with the one or more segments of the one or more images, the one or more segments of the one or more videos, the one or more segment latent vectors, or a combination thereof, and cause, at least in part, an indexing of the one or more segments based, at least in part, on the synchronized metadata.

17. An apparatus of claim 11, wherein the apparatus is further caused to:

determine at least one image, at least one video, at least one segment of at least one image, at least one segment of at least one video, or a combination thereof match at least one model associated with at least one landmark, and cause, at least in part, an indexing of the at least one image, the at least one video, the at least one segment of the at least one image, the at least one segment of the at least one video, or the combination thereof based, at least in part, on the at least one landmark.

18. An apparatus of claim 17, wherein the apparatus is further caused to:

cause, at least in part, an association of the at least one image, the at least one video, the at least one segment of the at least one image, the at least one segment of the at least one video, or the combination thereof with metadata associated with the at least one landmark, and cause, at least in part, an indexing of the at least one image, the at least one video, the at least one segment of the at least one image, the at least one segment of the at least one video, or the combination thereof based, at least in part, on the at least one landmark metadata, wherein the landmark metadata includes location information, orientation information, or a combination thereof.

19. An apparatus of claim 11, wherein the apparatus is further caused to:

receive one or more image queries, one or more video queries, or a combination thereof, and determine at least one image, at least one video, at least one segment of at least one image, at least one segment of at least one video, or a combination thereof that satisfies the one or more image queries, the one or more video queries, or the combination thereof based, at least in part, on the one or more media latent vectors.

* * * * *